(No Model.)
J. P. MONNETT.
FEEDING DEVICE FOR THRASHING MACHINES.
No. 450,084. Patented Apr. 7, 1891.
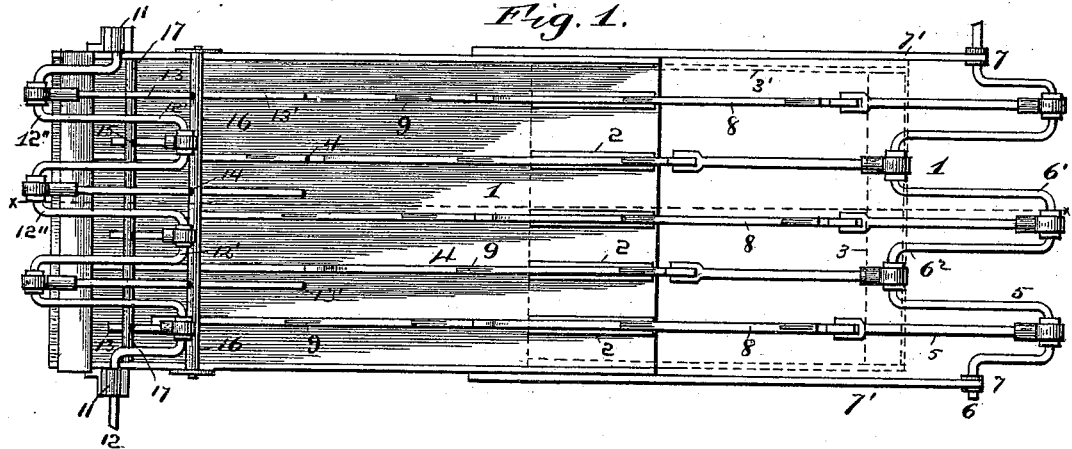
Fig. 1.
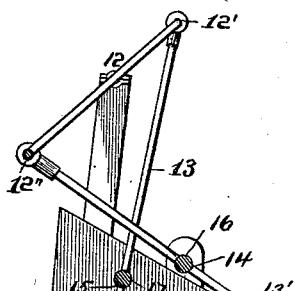
Fig. II.
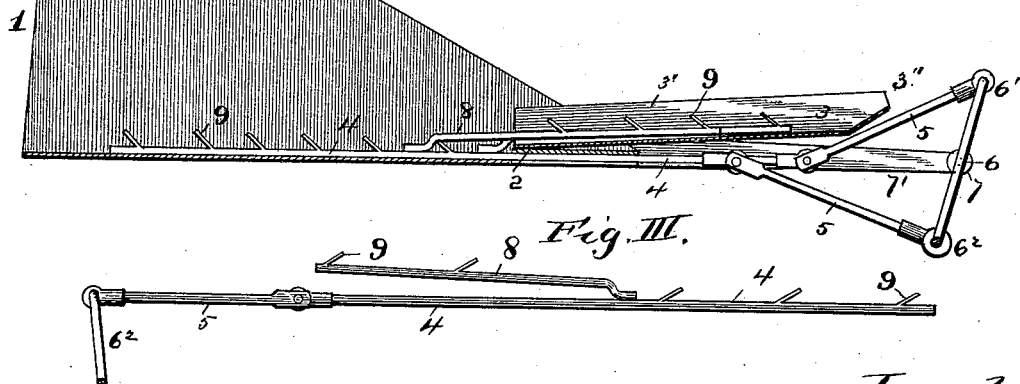
Fig. III.
Witnesses:
J. B. McGivn.
N. F. Benhart
Inventor,
John P. Monnett
By his Attorneys,
Edson Bro's

UNITED STATES PATENT OFFICE.

JOHN P. MONNETT, OF BUCYRUS, OHIO.

FEEDING DEVICE FOR THRASHING-MACHINES.

SPECIFICATION forming part of Letters Patent No. 450,084, dated April 7, 1891.

Application filed September 16, 1890. Serial No. 365,156. (No model.)

*To all whom it may concern:*

Be it known that I, JOHN P. MONNETT, a citizen of the United States, residing at Bucyrus, in the county of Crawford and State of Ohio, have invented certain new and useful Improvements in Feeding Devices for Thrashing-Machines; and I do hereby declare the following to be a full, clear, and exact description of the invention, such as will enable others skilled in the art to which it appertains to make and use the same.

My invention relates to improvements in feeding attachments for thrashing-machines and clover-hullers; and it has for its object to provide a simple and effective means for feeding the grain to the thrashing-cylinder constantly and uniformly and to thus prevent clogging of the machine.

With these and other ends in view my invention consists in the combination of devices and peculiar construction and arrangement of parts, as will be hereinafter fully described and claimed.

In order that others may understand my invention, I will now proceed to a detailed description thereof in connection with the accompanying drawings, in which—

Figure I is a plan view of a portion of the throat or hopper of a thrashing-machine having my improvements attached thereto. Fig. II is a longitudinal sectional view on the line $x\ x$ of Fig. I, and Fig. III is a detail view of one of the pusher-rods and its connections with the operating crank-shaft.

Like numerals of reference denote corresponding parts in all the figures of the drawings, referring to which—

1 designates the throat or hopper of a thrashing-machine or clover-huller, the bottom of this hopper being inclined from its outer end toward the thrashing-cylinder situated in rear of said throat or hopper.

On the bottom of the throat or hopper 1 and at the forward end thereof I arrange a series of parallel guides or ways 2, preferably circular in cross-section, and on these guides rests one end of a detachable feed-board 3, which is provided with an upwardly-extending flange or rim 3', that fits snugly within the throat or hopper 1 and is held in position by frictional contact with the side walls thereof; but, if desired, suitable fastening devices may be employed to hold the feed-board in place. The outer end of this detachable feed-board is inclined upwardly at 3'', and the feed-board itself is arranged in an inclined position for the purpose of preventing any grain placed thereon from sliding off.

Through the parallel guides 2 are arranged the pusher-rods 4, which extend snugly against and along the bottom of the throat or hopper 1, and at their forward ends they are pivoted to the bifurcated ends of a series of parallel pitmen 5, which in turn are attached at their outer ends to the cranks of a double-crank shaft 6. The crank-shaft 6 is journaled in suitable brackets or bearings 7 on the outwardly-extending arms 7', that are secured to the sides of the throat or hopper 1, and the cranks 6' $6^2$ of said crank-shaft are arranged on opposite sides of the axis of said shaft and alternately disposed in relation to each other.

The pusher-rods 4 are each provided at a point intermediate of its length with shorter branch rods 8, which extend toward the forward end of the throat or hopper at an angle to the main rods 4, and which pass or extend up over the detachable feed-board. The branch rods 8 are provided at suitable intervals with upwardly-extending fingers 9, which are inclined slightly to the axis of the same and extend from said rods in the direction the grain moves while being fed by the pusher-rods toward the thrashing-cylinder, and the main pusher-rods 4 are likewise provided with similar inclined fingers 9, which extend from the point of union of the rods 8 with the main rods to their inner ends.

Near the rear end of the throat or hopper 1, in suitable bearings 11, is journaled another horizontal double-crank shaft 12, the cranks 12' 12'' of which are arranged upon opposite sides of the axis of said shaft and out of line with each other. These cranks carry vertical rods or fingers 13 13', adapted to be projected through apertures or perforations 14 15 in the horizontal rocking bars 16 17, which are journaled in the sides of the throat or hopper 1. The rods 13 are connected to the cranks 12' and pass through perforations 14 in the oscillating or rocking bar 16, while the rods 13' are attached to the cranks 12'', which, as before explained, are out of line with the cranks 12' and pass through the perforations 15 in the bar 17.

The crank-shaft 12 and its connections are the same in structure and operation as the device shown and described in another application filed by me on February 24, 1890, Serial No. 341,479.

The pusher-rods extend to or in rear of the vertically-reciprocating fingers, (see Fig. II,) and they serve to carry the grain beneath said fingers, so that it is fed uniformly to the agitator, and choking or clogging of the grain is thus obviated.

The operation of my invention is simple and may be briefly stated as follows: The grain to be thrashed is placed on the feed-board 3 in the throat or hopper, and motion is communicated to the crank-shaft 6, the pusher-rods 4 and 8 are reciprocated back and forth in the throat or hopper, and the upwardly-extending fingers thereof engage the grain and push or force it along toward the rear of the throat or hopper to the thrashing-cylinder. At the same time that motion is communicated to the shaft 6 the shaft 12 operates the rods 13 13' to alternately project the same into and through the grain and withdraw the same therefrom, the fingers operating in perforations in the horizontal oscillating or rocking bars 16 17. On each downstroke of the rods 13 13' the lower ends thereof engage with the grain in the throat or hopper and as they begin their upward stroke force the grain along toward the thrashing-cylinder. Should the grain become bunched in the throat or hopper, the rods 13 13' catch such bunches and hold the same until the fingers on the pusher-rods operate to separate the bunch. It will thus be seen that by these means I am enabled to feed the grain to the thrashing-cylinder uniformly and evenly, and thus prevent clogging of the machinery and secure the best results.

Changes in the form and proportion of parts and details of construction can be made without departing from the spirit or sacrificing the advantages of my invention.

Having thus described my invention, what I claim as new, and desire to secure by Letters Patent, is—

1. In a thrashing-machine, the combination, with the throat or hopper, of the fixed feed-board, the pusher-rods operating in said throat partially beneath the feed-board and provided with the branch rods which extend over the feed-board, the fixed guides arranged below the feed-board and receiving the pusher-rods, and the crank-shaft for reciprocating the pusher-rods longitudinally of the hopper, as and for the purpose described.

2. In a thrashing-machine, the combination, with the throat or hopper, of the guides situated in the throat or hopper, the detachable feed-board fitted within the forward end of the throat or hopper, and the branched or divided pusher-rods arranged within the hopper and each having one member connected to the operating-crank and the other member extending over the feed-board, said pusher-rods being provided with a series of upwardly-extending fingers, as and for the purpose described.

3. In a thrashing-machine, the combination, with the throat or hopper, of the inclined feed-board, the branched pusher-rods arranged along the bottom of the throat or hopper and over the feed-board, said rods being provided with upwardly-extending inclined fingers, the double-crank shaft having the cranks thereon situated on opposite sides of the axis of the shaft, and connections below the feed-board and intermediate of the pusher-rods and the cranks of the crank-shaft, as and for the purpose described.

4. In a thrashing-machine, the combination, with a throat or hopper, of a series of parallel pusher-rods arranged in the bottom of the throat or hopper and provided with upwardly-extending fingers, a detachable feed-board arranged above the pusher-rods, a series of parallel rods provided with upwardly-extending fingers and attached to the main pusher-rods and extending over the feed-board, and mechanism, substantially as described, for reciprocating the pusher-rods over the surface of the bottom of the hopper and the feed-board, as and for the purpose described.

5. In a thrashing-machine, the combination of the throat or hopper, a fixed feed-board, a series of pusher-rods provided with the branches which extend over the feed-board, the guides arranged below the feed-board and receiving the pusher-rods, a double-crank shaft supported at the rear of the hopper over the inner ends of the pusher-rods, a series of fingers carried by said shaft, and two horizontal oscillating bars journaled in the side walls of the throat or hopper and receiving the fingers on the crank-shaft, as and for the purpose described.

In testimony whereof I affix my signature in presence of two witnesses.

JOHN P. MONNETT.

Witnesses:
ISAAC CAHILL,
D. C. CAHILL.